(12) United States Patent
Kim

(10) Patent No.: US 6,879,843 B1
(45) Date of Patent: Apr. 12, 2005

(54) DEVICE AND METHOD FOR STORING AND REPRODUCING DIGITAL AUDIO DATA IN A MOBILE TERMINAL

(75) Inventor: Dong-Woo Kim, Kumi (KR)

(73) Assignee: Samsung Electronics Co., Ltd. (KR)

( * ) Notice: Subject to any disclaimer, the term of this patent is extended or adjusted under 35 U.S.C. 154(b) by 581 days.

(21) Appl. No.: 09/633,059

(22) Filed: Aug. 8, 2000

(30) Foreign Application Priority Data

Aug. 12, 1999 (KR) ............................................ 99-33207

(51) Int. Cl.⁷ .......................... H04Q 7/32; H04M 1/725
(52) U.S. Cl. .................... 455/557; 455/556.1; 455/559
(58) Field of Search ............................. 455/557, 556.1, 455/566, 552.1, 414.1, 414.4, 419, 559, 556, 552, 575

(56) References Cited

U.S. PATENT DOCUMENTS

| | | | |
|---|---|---|---|
| 6,014,569 A * | 1/2000 | Bottum ...................... 455/466 |
| 6,021,325 A * | 2/2000 | Hall ........................... 455/412 |
| 6,167,116 A * | 12/2000 | Freadman ................. 379/88.01 |
| 6,212,359 B1 * | 4/2001 | Knox .......................... 455/3.1 |
| 6,317,609 B1 * | 11/2001 | Alperovich et al. ..... 455/556.1 |
| 6,332,175 B1 * | 12/2001 | Birrell ........................ 711/112 |
| 6,470,051 B1 * | 10/2002 | Campisano ............ 375/240.21 |
| 6,584,510 B2 * | 6/2003 | Anttila ....................... 709/250 |
| 6,587,684 B1 * | 7/2003 | Hsu et al. .................... 455/419 |
| 6,671,567 B1 * | 12/2003 | Dwyer et al. ................. 700/94 |

FOREIGN PATENT DOCUMENTS

| | | | |
|---|---|---|---|
| DE | 199 43 306 A1 | 4/2000 | |
| DE | 199 17 169 A1 | 11/2000 | |
| EP | 0 804 012 | * 10/1997 | .......... H04M/11/08 |
| EP | 0804012 | * 10/1997 | .......... H04M/11/08 |
| EP | 0 898 378 A2 * | 2/1999 | ............ H04B/1/20 |
| EP | 1 049 312 A2 | 11/2000 | |
| GB | 2 308 775 A * | 2/1997 | ............ H04M/1/02 |
| WO | WO 00/70896 | 11/2000 | |

* cited by examiner

*Primary Examiner*—William Trost
*Assistant Examiner*—Brandon J. Miller
(74) *Attorney, Agent, or Firm*—Dilworth & Barrese LLP

(57) ABSTRACT

A method and device for reproducing digital audio data in a mobile station is disclosed. The mobile station can be connected by an adapter with a personal computer in order to download MP3 digital audio data which was previously downloaded from the Internet to a hard disk on the personal computer. The adapter converts parallel data from the computer into serial data for the mobile station, and vice versa. The MP3 digital audio data is downloaded to the mobile station according to a downloading program stored in the personal computer. One method according to the invention comprises the steps of downloading the MP3 audio data stored in the computer to a memory device of the mobile station, and selectively reproducing the MP3 audio data stored in the memory device.

11 Claims, 9 Drawing Sheets

DEVICE AND METHOD FOR STORING AND REPRODUCING DIGITAL AUDIO DATA IN A MOBILE TERMINAL

PRIORITY

This application claims priority to an application entitled "Mobile Station with a Digital Audio Data Storing/Reproducing Device and Method for Controlling It" filed in the Korean Industrial Property Office on Aug. 12, 1999 and assigned Serial No. 99-33207, the contents of which are hereby incorporated by reference.

BACKGROUND OF THE INVENTION

1. Field of the Invention

The present invention relates to a mobile phone with a digital audio data storing/reproducing device that enables the mobile phone to store/reproduce digital audio data, which may be supplied from the Internet or a CD player.

2. Description of the Related Art

The MP3 computer file format is used to compress large amounts of information into small packages that can easily be sent over the Internet. "MP3" is the common name for MPEG ½ layer-3, a standard established by the Moving Pictures Engineering Group (MPEG) under the auspices of the International Organization for Standardization (ISO). The MP3 compressed information can be anything capable of being stored as digital information, such as video clips, art, or music. The information can be decompressed during playback and used or stored as a computer file.

If MP3 technology was employed in a mobile phone, it would be possible for the user of the mobile phone to listen to music without carrying a portable cassette tape recorder or MP3 player.

SUMMARY OF THE INVENTION

It is an object of the present invention to provide a mobile station with a device for storing MP3 audio data received from the Internet or a CD player through a computer and reproducing it as desired, and a method therefor.

According to an aspect of the present invention, a mobile station is connected by an adapter with a personal computer in order to download MP3 digital audio data, which was previously downloaded from the Internet to a hard disk in the personal computer. The adapter converts parallel data from the computer into serial data for the mobile station, and vice versa. The MP3 digital audio data is downloaded to the mobile station according to a downloading program stored in the personal computer. A method for reproducing digital audio data in a mobile station comprises the steps of downloading the MP3 audio data stored in the computer to a memory device of the mobile station, and selectively reproducing the MP3 audio data stored in the memory device.

BRIEF DESCRIPTION OF THE DRAWINGS

The preferred embodiment of the present invention will be described more specifically with reference to the drawings attached only by way of example.

DETAILED DESCRIPTION OF THE PREFERRED EMBODIMENT

In the following description of the preferred embodiment, a detailed description of conventional components not directly related to the invention is omitted in order to avoid confusion.

Figure 1:
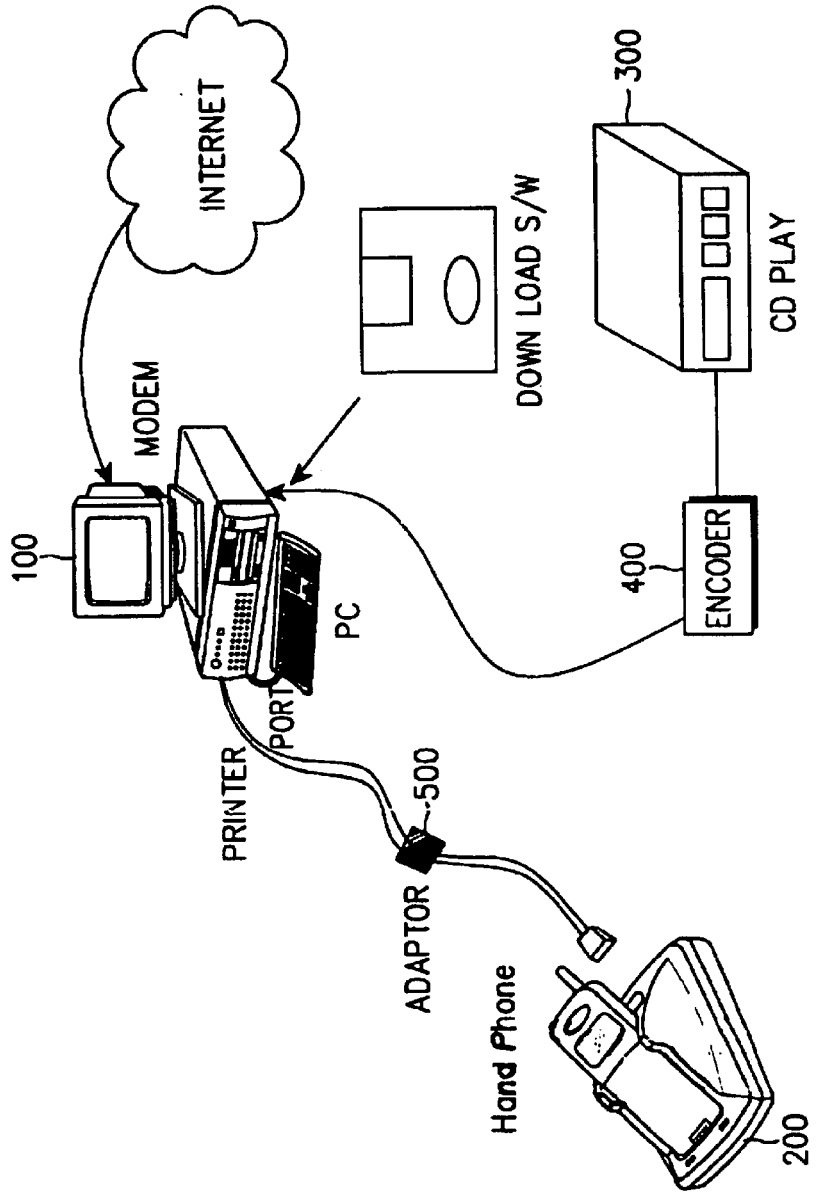
FIG. 1 is a schematic diagram for illustrating the procedure of downloading digital audio data, which has been downloaded from the Internet or a CD player to a computer, to a mobile station, according to the present invention.

Referring to FIG. 1, a personal computer 100 stores digital audio data or MP3 files in memory. Digital audio data or MP3 files can be downloaded from the Internet or an encoder 400, and the computer 100 is equipped with a download program for downloading digital audio data to a mobile phone 200, which can store and reproduce it. A CD player 300 reproduces the digital audio data recorded on a compact disk (CD). The encoder 400 converts the audio data reproduced by the CD player 300 into a corresponding MP3 file delivered to the personal computer 100. An adapter 500 is needed in order to connect the personal computer 100 and mobile phone 200 when downloading MP3 files. Adapter 500 converts parallel data from the personal computer 100 into serial data for the mobile phone 200, and vice versa. The adapter 500 is connected to the printer port of the personal computer 100 and the J2 connector of the mobile phone 200. The audio data downloaded from the personal computer consists of, for example, 8-bit parallel and control data.

Figure 2:
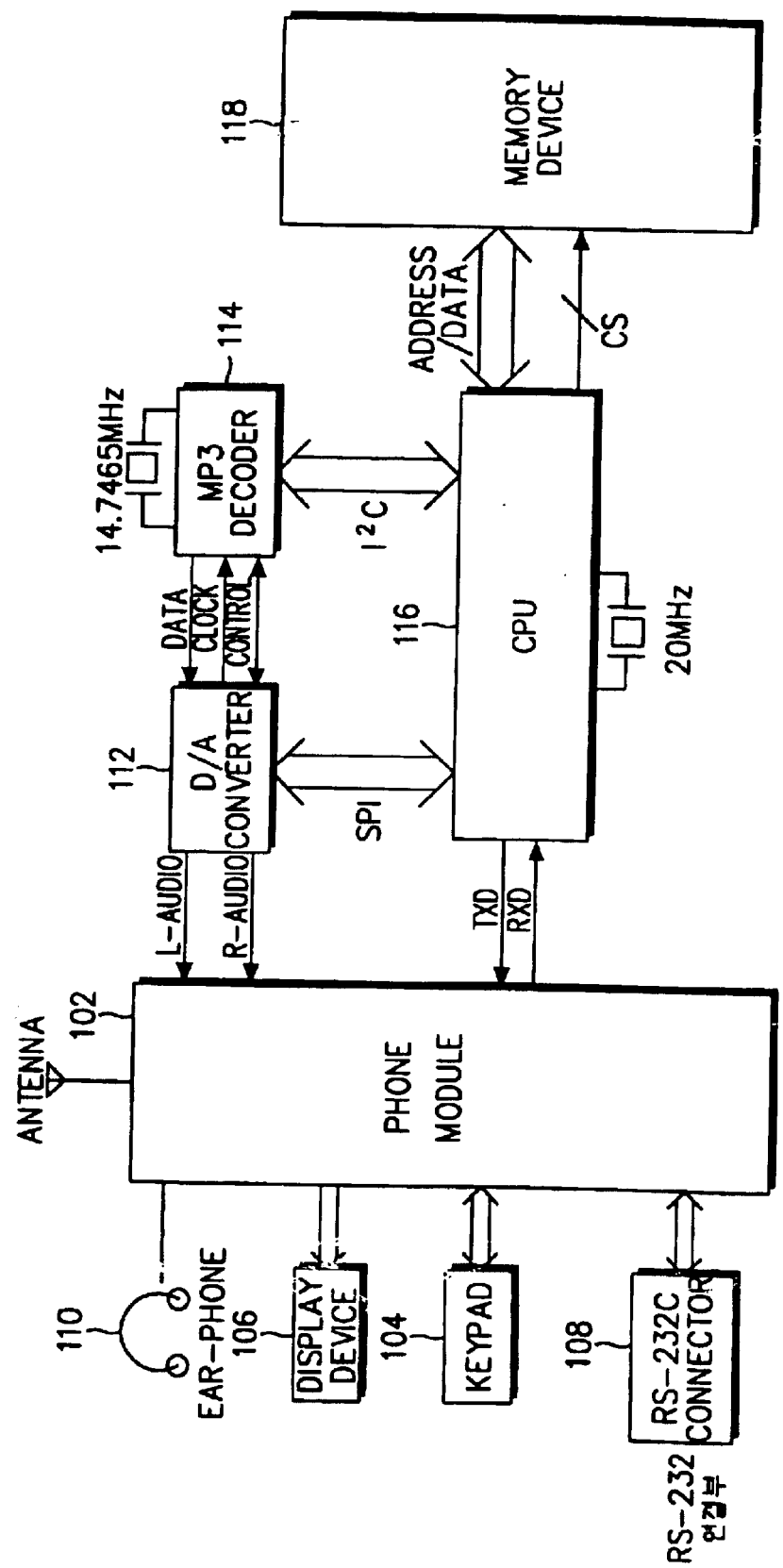
FIG. 2 is a block diagram for illustrating a mobile station provided with a device for storing/reproducing digital audio data according to the present invention.

Referring to FIG. 2, a phone module 102 controls the ordinary functions of the mobile station, enabling the digital audio data (i.e., MP3) to be downloaded from a personal computer 100 to the mobile station when there is a download key input on the key pad, and reproducing the sound of the digital audio data when it is selected to play back using the keypad 104. The keypad 104 has a plurality of alphanumeric keys which a user uses to input commands in order to perform mobile communication, to record (to store) digital audio data in the mobile station, to play or to stop the reproduction of sound from the stored digital audio data, to rewind the stored digital audio data, and fast forwarding the stored digital audio data. A display device 106 displays information generated from the keypad 104 and the phone module 102 under the control of the phone module 102. The display device 106 consists of an LCD, and light emitting diodes so that the user can see information displayed on the LCD at night. An RS-232C connector 108 enables the mobile station to exchange audio data (MP3 files) and other data with the personal computer 100. An earphone 110 is connected to the phone module 102 to generate the sound of the audio data supplied from the phone module 102.

An MP3 decoder 114 is for decoding MP3 audio data into corresponding PCM (Pulse Code Modulation) data, and can be, for example, a STO13 module manufactured by STMICROELECTRONICS Co. Specifically, it de-multiplexes the MP3 audio data, which can be an encoded audio stream, at 8 to 320 kbps, into control data and audio data in order to Huffman-decode the audio data from the run-length coded compressed signal to the signal of the original length, to subject each sub-band of the signal to re-quantization and re-scaling according to the control data, to recover the resulting data by the inverse discrete cosine transformation, and to inversely filter each sub-band to finally obtain the PCM data. A D/A (digital to analog) converter 112 converts the PCM audio data from the MP3 decoder into the corresponding analog audio data, and can be, for example, a CS4331 module for stereo audio manufacture by CRYSTAL Co. It includes circuits for digital interpolation, delta-sigma D/A conversion digital de-emphasis, and filtering. A Central Processing Unit (CPU) 116, which can be a H8/2134 module manufactured by HITACHI Co., controls the storage (in memory device 118) and reproduction of the MP3 audio data received from the phone module.

The personal computer 100, as shown in FIG. 1, stores on the hard disk a MP3 file downloaded from the Internet or the encoder 400 connected to CD player 300. The personal computer 100 also must be installed with a MP3 control program for the mobile station. For example, the CD storing the MP3 control program is inserted into the CD driver of the computer, and then used to generate an MP3 control program folder on the personal computer 100. Then, the personal computer 100 is connected to the mobile station 200 with the adapter cable.

Figure 3A:
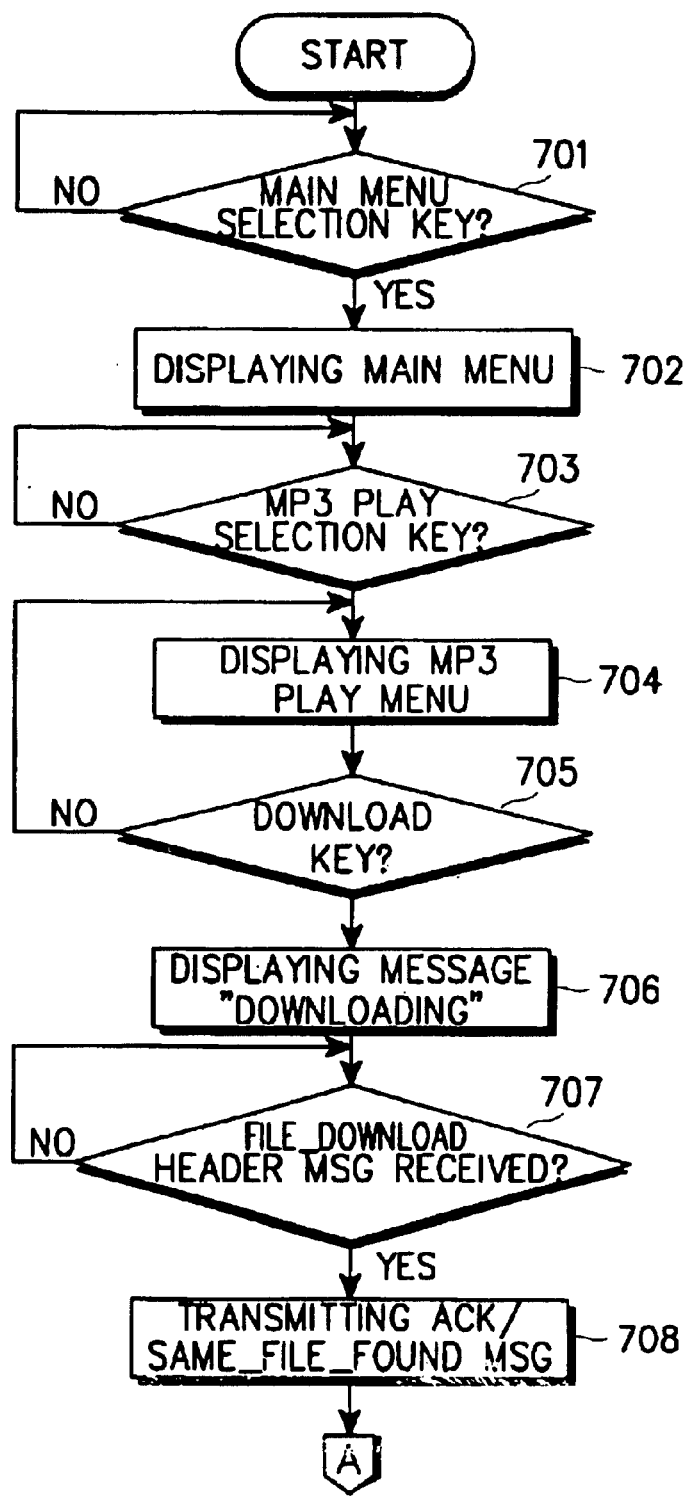
FIGS. 3A and 3B are flow charts for illustrating the process of a mobile station to receive an MP3 file according to the present invention.

Hereinafter, the process of downloading an MP3 file from a personal computer to the mobile station is described in connection with FIGS. 3A to 4. Referring to FIG. 3A, detecting the main menu selection key inputted from the keypad 104 in step 701, the phone module 102 proceeds to step 702 to display the main menu in the display device 106 as shown in Table 1.

TABLE 1

| 0. | MP3 Player |
| 1. | Voice Dial |
| 2. | Bell/Vibrator Intensity |
| 3. | Time Schedule |
| 4. | Arrangement/Alarm |
| 5. | Private Information |
| 6. | Additional Services |

If the user presses the key numbered '0' in step 703, the phone module 102 proceeds to step 704 to display the MP3 play menu in the display device as shown in Table 2.

TABLE 2

| MP3 Play | |
| --- | --- |
| 0. | Play Mode |
| 1. | Download |
| 2. | File List |
| 3. | Delete File |

As shown in Table 2, the keys numbered respectively '0', '1', '2', and '3' are pressed in order to play, an MP3 file, download an MP3 file, list the names of the stored MP3 files, and delete the stored MP3 files, respectively. For example, if the key numbered '1' (the download command) is pressed in step 705, the phone module 102 proceeds to step 706 to display the downloading message in the display device 106.

Figure 3B:
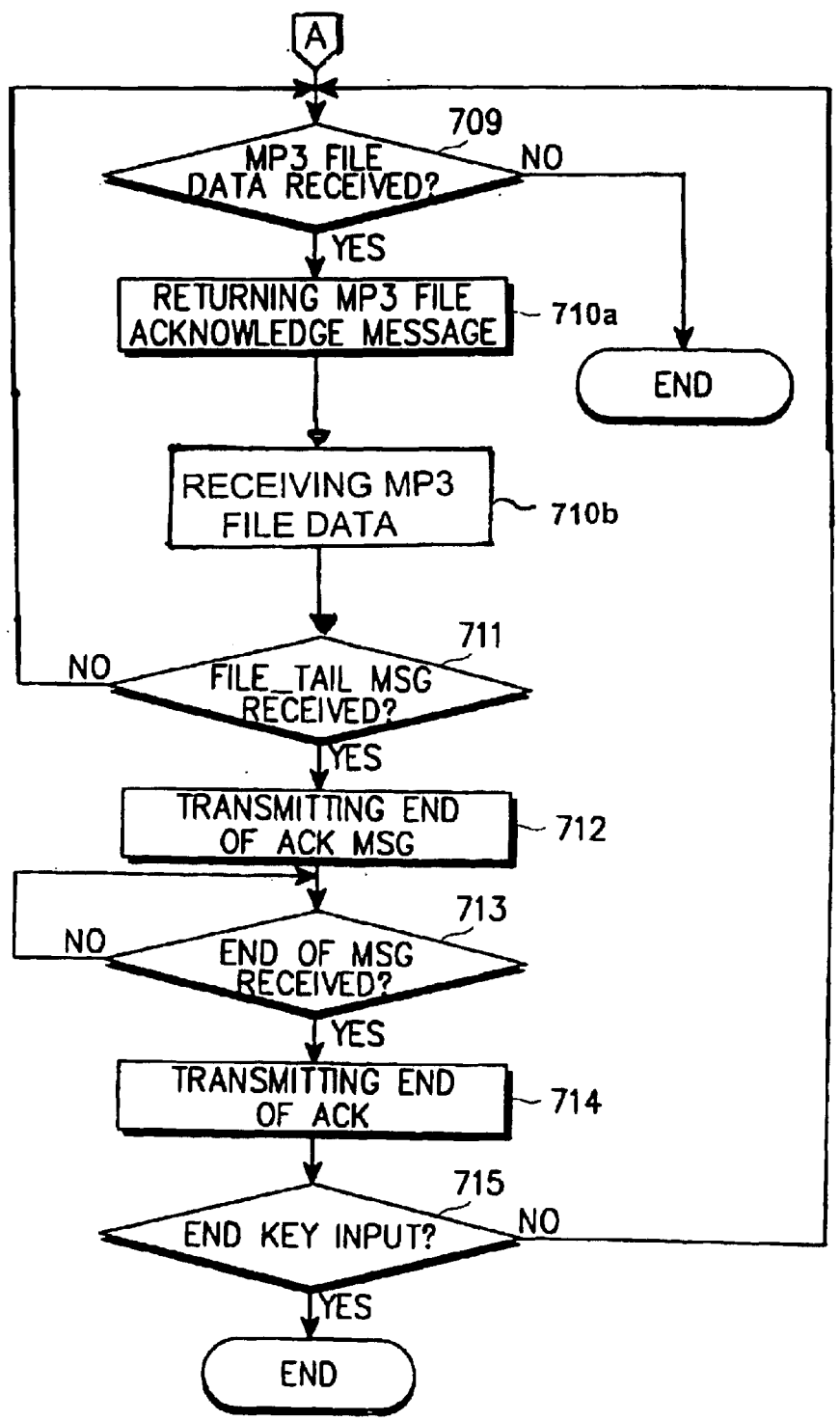
Figure 4A:
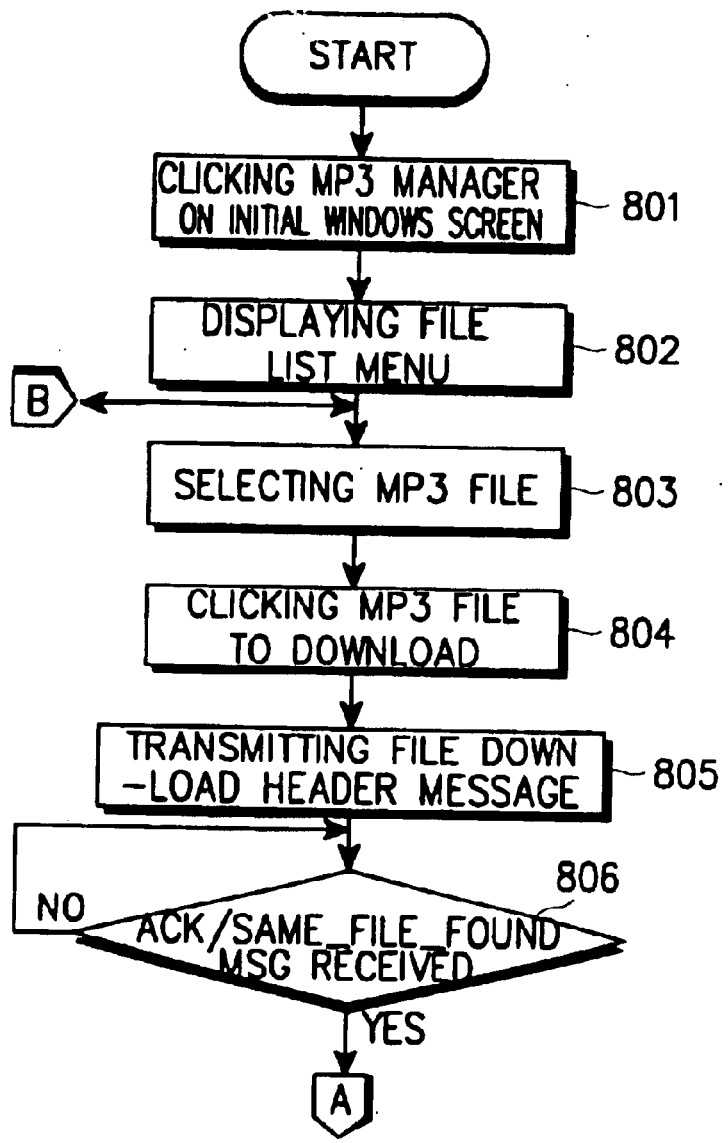
FIG. 4 is a flow chart for illustrating the process of a personal computer for downloading an MP3 file to a mobile station according to the present invention.

Meanwhile, referring to FIG. 4A, if the user clicks the MP3 manager icon displayed on the desktop screen of the personal computer 100 in step 801, the computer 100 displays a menu list of MP3 files on the monitor screen in step 802. Selecting an MP3 file from the file list menu in step 803, and clicking the selected MP3 file in order to download it in step 804, the computer 100 proceeds in step 805 to transmit the file download header message FILE_DOWNLOAD HEADER MSG through the RS-232C connector 108 to phone module 102 in the mobile station. Then, as shown in FIG. 3A, the phone module 102 detects the FILE_DOWNLOAD HEADER MSG in step 707 and proceeds in step 708 to return the file download message acknowledge message ACK/SAME_FILE_FOUND MSG to the personal computer 100. Accordingly, as shown in FIG. 4A, the personal computer 100 receives the ACK/SAME_FILE_FOUND MSG in step 806, and proceeds, jumping to FIG. 4B, in step 807 to transmit the MP3 file data FILE BODY 1 to the phone module 102. Then, as shown in FIG. 3B, the phone module 102 detects FILE BODY 1 in step 709, proceeds in step 710b to receive the MP3 file data after returning the MP3 file data acknowledge message to the personal computer 100 in step 710a. The MP3 file data received is transferred to the CPU 116, and then stored into the memory 118.

Figure 4B:
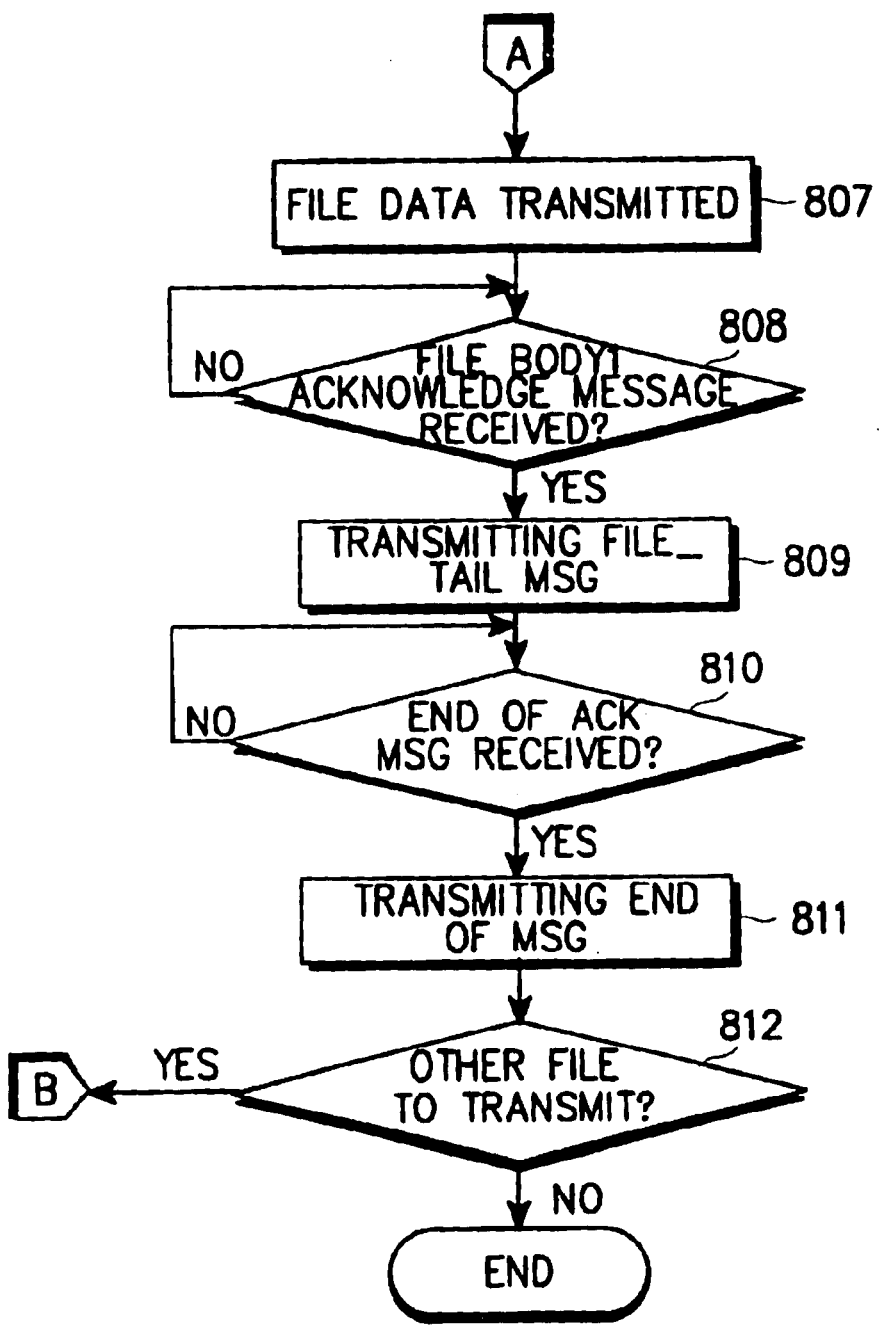

Subsequently, as shown in FIG. 4B, the personal computer 100, after detecting the FILE BODY 1 acknowledge message in step 808, transmits the file transmission complete message FILE_TAIL_MSG to the phone module 102 in step 809 after completing the transmission of the MP3 file data. Then, returning to FIG. 3B, the phone module 102 proceeds to step 712 or returns to step 709 depending on whether the FILE_TAIL_MSG is received (step 712) or not (step 709) in step 711. The acknowledgment of the MP3 file information is transmitted to the personal computer, and, if the MP3 file is not received within five seconds when receiving the MP3 file from the personal computer, the existing received data is canceled and returns to the initial value. When the FILE_TAIL_MSG is received in step 711, the phone module 102 transmits the end of acknowledge message END_OF_ACK_MSG to the personal computer in step 712. Then, as shown in FIG. 4B, the personal computer 100, after detecting END_OF_ACK_MSG in step 810, proceeds to step 811 to transmit the end of file transmission message END_OF_MSG to the phone module. Finally, in step 812, the personal computer 100 either returns to step 803 or terminates the process, depending on whether there is another file to be transmitted (step 803) or not (end). Meanwhile, returning to FIG. 3B, the phone module 102, after detecting END_OF_MSG in step 713, proceeds to step 714 to transmit the end of acknowledge message END OF ACK to the personal computer 100. Finally, in step 715, the phone module terminates the download process or returns to step 709 depending on whether the end key is inputted from the keypad 104 (end) or not (step 709).

Figure 5A:
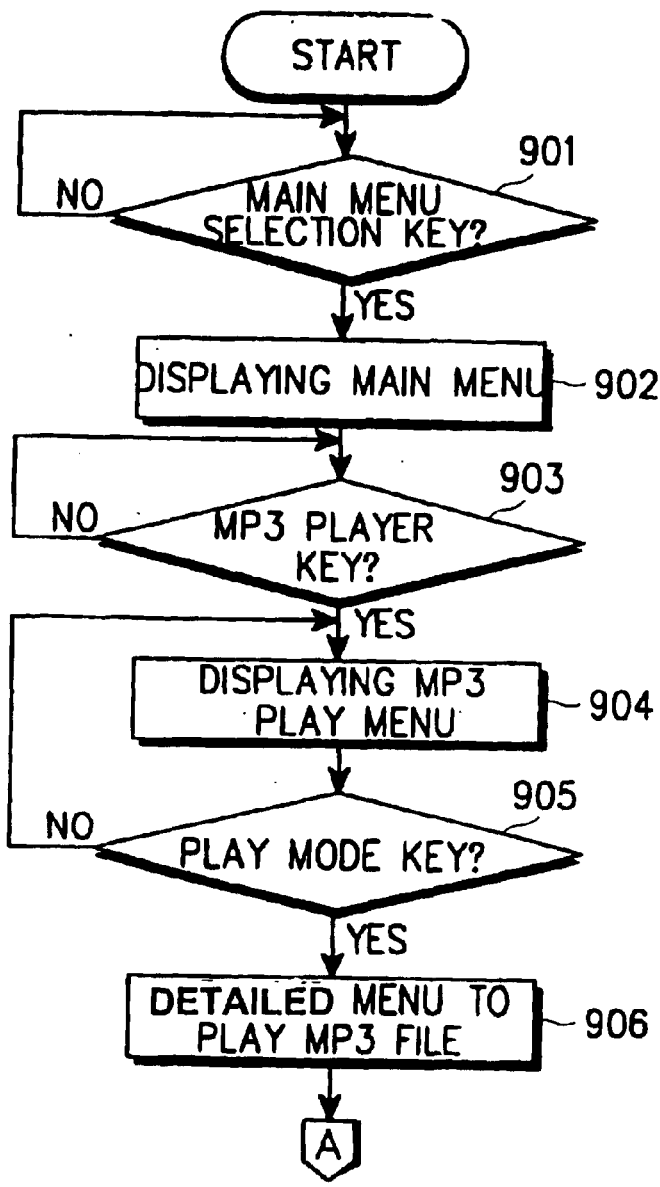
FIGS. 5A–5C are flow charts for illustrating the process of a mobile station for reproducing the sound of an MP3 file data according to the present invention.
Figure 5B:
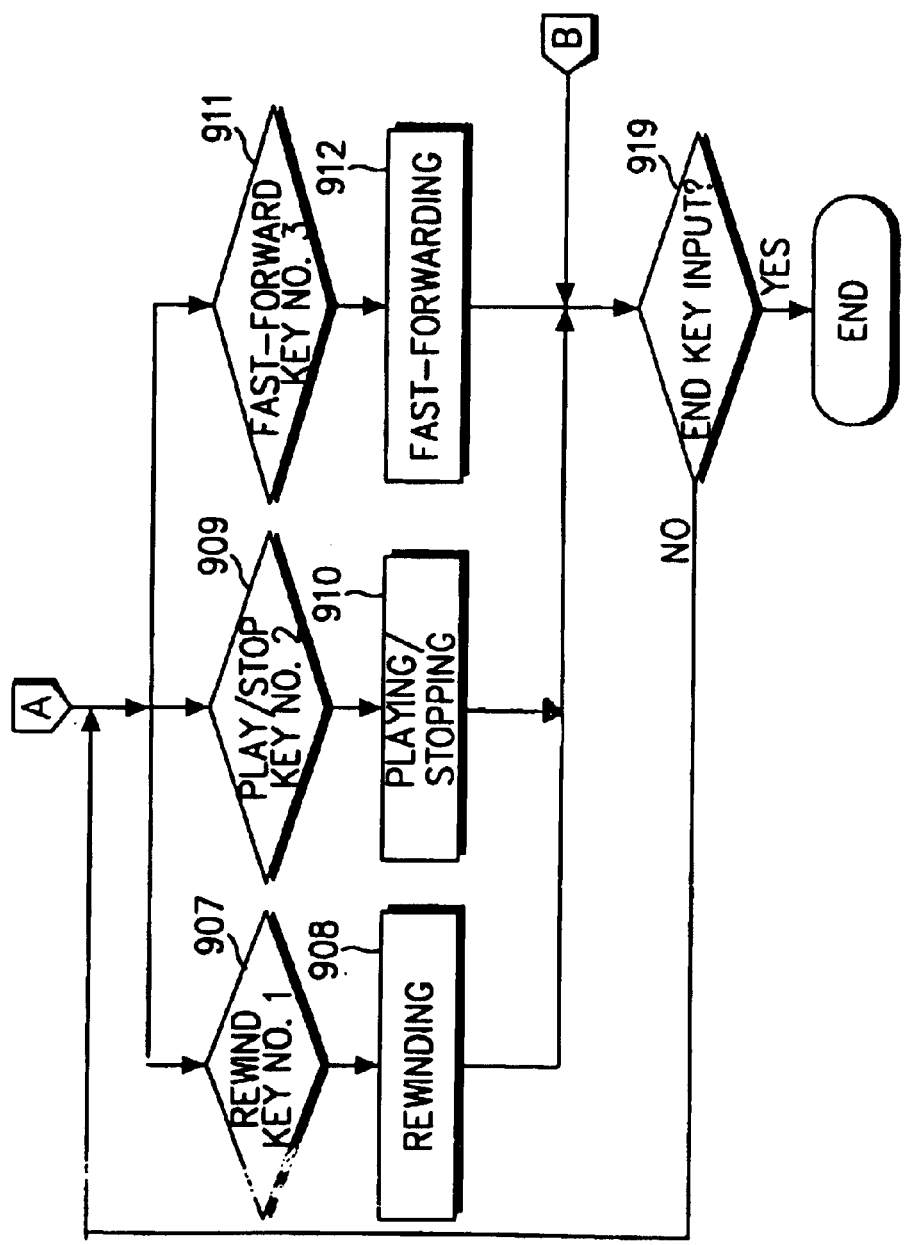
Figure 5C:
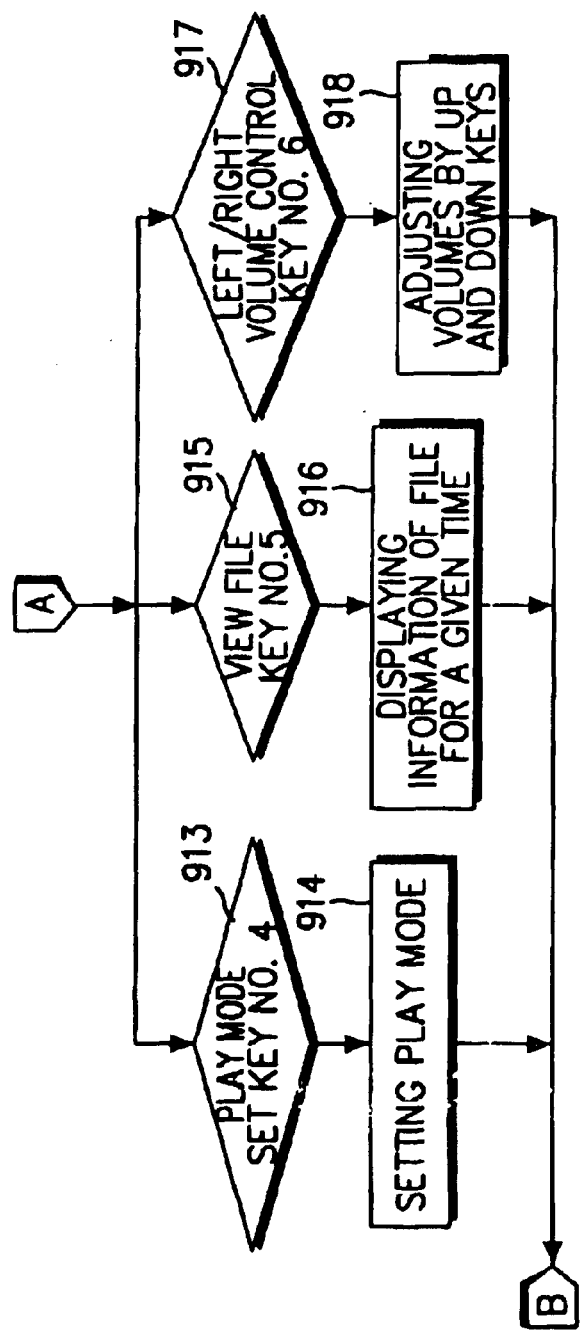

Next, the procedure of reproducing the sound of the MP3 file stored in the mobile station will be described in connection with FIGS. 5A, 5B and 5C. If the phone module 102 detects that the main menu selection key is input from the keypad 104 in step 901, it proceeds to step 902 to display the main menu as shown in Table 1 in display device 106. If the user presses key No.0 in step 903 to select the MP3 payer, the phone module 102 proceeds to step 904 to display the MP3 play menu shown in Table 2, in display device 106. In the MP3 play menu, the user presses key No. 0 to play an MP3 file, key No. 1 to download an MP3 file, key No. 2 to view the file list, and key No. 3 to delete a file. If he presses No. 0 key to play in step 905, the phone module 102 proceeds to step 906 to display the detailed MP3 play mode menu shown in Table 3 in the display device.

TABLE 3

MP3 Play Mode

| | |
|---|---|
| 1. | Rewind |
| 2. | Play/Stop |
| 3. | Fast Forward |
| 4. | Play Mode Set |
| 5. | View File |
| 6. | Left/Right Volume Control |

In the MP3 play mode menu, the user may press key No. 1 to rewind, key No. 2 to play/stop, key No. 3 to fast forward, key No. 4 to set the play mode, key No. 5 to view the file, and key No. 6 to control the right and left volumes. For example, as shown in FIG. 5B, if the phone module 102 detects the rewind key No. 1 input in step 907, the phone module 102 proceeds in step 908 to rewind. The rewind command might be to skip to the previous or the first music piece by a short or prolonged press of the rewind key while not playing the music, to the starting position of the music piece presently being played by a short press of the rewind key while playing the music, to the starting position of the previous music piece by a short press of the rewind key when starting the following music piece, or to a desired rewind position by pressing the rewind key for a proper prolonged time while playing the music.

If the play/stop key No. 2 is pressed in step 909, the phone module 102 proceeds in step 910 to stop if it is presently playing, or play if it is presently stopped. If the fast forward key No. 3 is pressed in step 911, the phone module 102 proceeds in step 912 to fast forward. The fast forward command might be to skip to the next or the last music piece by a short or prolonged press of the rewind key while not playing, to skip to the starting position of the next music piece by a short press of the fast forward key while playing the music, or to the music piece of a desired forward position by pressing the rewind key for a proper prolonged time while playing the music. As shown in FIG. 5C, if the play mode set key No. 4 is pressed in step 913, the phone module 102 proceeds to step 914 to set a different play mode when the user repeatedly presses the play mode set key, thus selecting the different play modes shown in Table 4.

TABLE 4

| REPEAT | Repeating the present music piece until pressing the stop key |
|---|---|
| REPEAT ALL | Repeating the presently ordered sequence of music pieces until pressing the stop key |
| SHUFFLE | Shuffled playing of selected music pieces |
| REPEAT SHUFFLE | Repeating shuffled playing of selected music pieces until pressing the stop key |
| NORMAL | Ordinary playing mode |

Each of the different playing modes shown in Table 4 may be selected by sequentially pressing the play mode set key No. 4.

If the view file key No. 5 is inputted through the keypad 104 in step 915, the phone module 102 proceeds to step 916 to display the information of the MP3 files for a predetermined duration. Namely, if the view file key is pressed while playing a file, its information is displayed for a short duration. Alternatively, if the key is pressed while not playing the music, the information of the file presently held is displayed. If the left/right volume control key No. 6 is inputted through the keypad 104, the phone module 102 proceeds to step 918 to display the presently set intensities of the right and left volumes of the earphone, in order to adjust them by means of proper selection keys such as up and down keys provided in the keypad. Returning to FIG. 5B, finally detecting the end key input through the keypad 104 in step 919, the phone module terminates the detailed MP3 play mode menu. Or otherwise, it waits to perform the steps 907 to 918 according to corresponding key inputs from the keypad 104.

Additionally, the inventive MP3 play menu may include call receiving, displaying play state, file list, all deletion, memory state, download information, etc. The call receiving is to select connection or non-connection with a call during music playing. If non-connection is selected, the phone module does not generate a ring, called during music playing. However, this is not applied when the phone module does not play the music. The displaying play state is to display the volume intensity, playing time, playing sequence, etc. This, however, increases the consumption of the battery. The file list is to display the list of the ordered music pieces, and the size of a selected music piece, and makes it possible to delete a selected music piece. The all deletion is to all of the MP3 files stored in the memory. The memory state is to display the information of the total and used sizes of the memory. The download information is to display the names, dates and times of the MP3 files downloaded.

Thus, the present invention provides means for enabling the mobile station to store and reproduce the MP3 music files downloaded from a personal computer, so that the user may enjoy the MP3 file music without an additional MP3 player.

While the present invention has been described in connection with specific embodiments accompanied by the attached drawings, it will be readily apparent to those skilled in the art that various changes and modifications may be made thereto without departing from the spirit of the present invention.

What is claimed is:

1. A mobile phone for storing and reproducing digital audio data, comprising:
    a keypad having a plurality of alphanumeric keys used for commanding a phone module to make mobile communication and to manipulate digital audio data;
    a phone module for controlling the ordinary functions of said mobile phone, for enabling digital audio data to be downloaded from a personal computer to said mobile phone according to a key input through said key pad, and for enabling the sound of the digital audio data to be reproduced according to a key input through said key pad;
    an RS-232 connector for connecting said phone module and personal computer to exchange digital audio data and other data; and
    a digital audio data module for storing the digital audio data from said phone module for playing or stopping sound reproduced from the stored digital audio data, for rewinding the sound reproduced, and for fast-forwarding the sound reproduced.

2. The mobile phone as recited in claim 1, wherein the digital audio data is MPEG (Moving Pictures Engineering Group) ½ Layer-3, or MP3, data and the digital audio data module is a MP3 module.

3. The mobile phone as recited in claim 2, wherein said MP3 module comprises:
    a memory device for storing MP3 digital audio data;
    a Central Processing Unit (CPU) for controlling the MP3 audio data receiving from said phone module to be stored in or reproduced from said memory device;

an MP3 decoder for de-multiplexing MP3 audio data into control data and audio data for Huffman-decoding the audio data from run-length coded compressed signals to original length signals, for subjecting each sub-band of the signal to re-quantization and re-scaling according to said control data, for recovering the resulting data by an inverse discrete cosine transformation, and for inversely filtering each sub-band to finally obtain PCM (Pulse Code Modulation) data; and a digital to analog (D/A) converter for converting PCM audio data delivered from said MP3 decoder into corresponding analog audio data.

4. A method for reproducing digital audio data in a mobile phone, comprising the steps of:

downloading digital audio data stored in a personal computer to a memory device of said mobile phone; and selectively reproducing or playing said digital audio data stored in said memory device;

wherein said mobile phone includes a phone module for mobile communications and a digital audio data module, said digital audio data module for
storing said digital audio data to said memory device, and using said stored digital audio data to produce audible sounds, further wherein said the mobile phone can be connected to said personal computer by means of an adapter.

5. The method as recited in claim 4, wherein the digital audio data is MPEG (Moving Pictures Engineering Group) ½ Layer-3, or MP3, data.

6. The method as recited in claim 4, wherein the step of reproducing said digital audio data comprises the steps of:

selecting digital audio data play mode from a main menu;

displaying a detailed menu for playing said digital audio data; and sequentially playing said digital audio data upon selecting a play key in said detailed menu.

7. The method as recited in claim 6, further comprising the step of:

rewinding said digital audio data to a first stored position of said digital audio data upon selecting a rewind key in said detailed menu.

8. The method as recited in claim 4, further comprising the step of:

replaying said digital audio data from a first stored position upon prolonged pressing of a rewind key during playing.

9. The method as recited in claim 4, further comprising the step of:

moving a playing position to a starting point of said digital audio data next to that presently being played upon a short press of a fast forward key during playing.

10. The method as recited in claim 6, further comprising the step of:

fast-forwarding a playing position to a starting point of a next digital audio data upon a short press of a fast forward key in said detailed menu.

11. The method as recited in claim 4, further comprising the step of:

fast-forwarding a playing position to a starting point of a last digital audio data.

* * * * *